United States Patent [19]

Bramwell

[11] Patent Number: 5,242,248

[45] Date of Patent: Sep. 7, 1993

[54] METHOD FOR TREATING SOIL IN A PERFORMANCE ARENA

[75] Inventor: Barbara K. Bramwell, Stillwater, Okla.

[73] Assignee: STS Products, Inc., Stillwater, Okla.

[21] Appl. No.: 31,078

[22] Filed: Mar. 11, 1993

Related U.S. Application Data

[63] Continuation of Ser. No. 660,481, Feb. 22, 1991, abandoned.

[51] Int. Cl.$^5$ ................................................. C09K 3/22
[52] U.S. Cl. .................................... 405/264; 405/263; 405/258
[58] Field of Search ............... 405/263, 264, 265, 258, 405/270

[56] References Cited

U.S. PATENT DOCUMENTS

| | | | |
|---|---|---|---|
| 4,064,940 | 12/1977 | Sparlin | 405/263 X |
| 4,417,992 | 11/1983 | Bhattacharyya et al. | 299/12 X |
| 4,425,165 | 1/1984 | Bryhn et al. | 405/263 X |
| 4,425,167 | 1/1984 | Bryhn | 405/263 X |
| 4,690,589 | 9/1987 | Owa | 405/263 |
| 4,793,741 | 12/1988 | Lahalih et al. | 405/263 |
| 4,867,613 | 9/1989 | McLeod et al. | 405/263 |
| 4,988,238 | 1/1991 | Szekely et al. | 405/263 |
| 5,008,019 | 4/1991 | Trost | 405/263 X |

OTHER PUBLICATIONS

"Sta-Wet" Owner's Manual, Allied Colloids, Date Unknown.

*Primary Examiner*—Randolph A. Reese
*Assistant Examiner*—J. Russell McBee
*Attorney, Agent, or Firm*—Dunlap, Codding & Lee

[57] ABSTRACT

A method for treating the soil in a performance arena. An effective amount of a treatment composition is applied to the soil in a performance area in the performance arena. The treatment composition is a water absorbing substance having a slow water releasing capability whereby the treatment composition absorbs water and slowly releases the absorb water for substantially reducing dust resulting in performance activities. The treatment composition in a preferred form is a gel-forming, water absorbing polymer or, more particularly, a crosslinked polyacrylamide polymer. The method particularly is directed to treating the performance area in an animal arena such as an indoor or outdoor facility where horse shows or rodeos or the like occur.

34 Claims, No Drawings

METHOD FOR TREATING SOIL IN A PERFORMANCE ARENA

This is a continuation of co-pending application U.S. Ser. No. 07/660,481 filed on Feb. 22, 1991, entitled "Method for Treating Soil in a Performance Arena" and now abandoned.

FIELD OF THE INVENTION

The present invention relates to treating soil in a performance arena, particularly an animal arena, by applying an effective amount of treatment composition wherein the treatment composition is a water absorbing substance having a slow water releasing capability for reducing dust resulting in performance activities and, particularly, using a treatment composition consisting of a gel-forming, water absorbing polymer or, more particularly, a crosslinked polyacrylamide polymer.

BRIEF DESCRIPTION OF THE INVENTION

The present invention defines a method for treating soil in a performance area in a performance arena wherein performance activities occur.

The term "performance arena" as used herein means an indoor or outdoor facility where animal shows occur such as horse shows or rodeos or where soccer is played or where football is played or where baseball is played or where polo is played. The term "animal arena" as used herein means an indoor or outdoor facility wherein horse shows or rodeos occur.

The term "performance area" as used herein means the area in the performance arena where the performance activities occur such as the area where the horses perform or where the rodeo events occur or where soccer is played or where polo is played or where baseball is played. In a more limited capacity the term "performance area" particularly refers to the soil areas as opposed to areas also containing grass and, when used in this context the term "soil performance area" will be used, and the term "sod performance area" will be used when referring to those areas having grass as well as soil.

The term "performance activities" as used herein means the activities of the event as opposed to the spectators such as the showing of the horses, the performance of the rodeo events, the playing of baseball activities, the playing of soccer activities or the playing of football activities.

DETAILED DESCRIPTION OF THE INVENTION

In practicing the method of the present invention, the soil in the performance area first is worked or tilled using a chisel, rototiller or harrow or other such working instrument in order to break up the soil. The soil in the performance area is worked until the soil has a predetermined consistency, that is, until the soil consists of soil particles of relatively uniform size wherein large aggregates of soil substantially are eliminated. The working of the soil in the performance area until the soil has a predetermined consistency is well known in the art and the various devices used to work the soil also are well known in the art.

After working the soil in the performance area, an effective amount of a treatment composition is applied to the soil in the performance area. The treatment composition can be applied using a device commonly referred to as a "seeder" or by hand. The treatment composition is applied over the entire performance area in a relatively uniform manner.

The treatment composition is a water absorbing substance having a relatively slow water releasing capability whereby the treatment composition is capable of absorbing and retaining water and slowly releasing the absorbed water over a period of time. The treatment composition preferably is a gel-forming, water absorbing polymer, and, more particularly, a crosslinked polyacrylamide polymer. Crosslinked polyacrylamide polymers such as contemplated by the present invention are commercially available and one such polyacrylamide copolymer is available from Allied Colloids, designated by the brand name Alcosorb AB3C.

Using the particularly polyacrylamide copolymer commercially available from Allied Colloids, sold under the tradename of Alcosorb AB3C, referred to before, it has been found that the treatment composition should be applied to the soil in the performance area in amounts from about 5 pounds of treatment composition per 1,000 square feet of performance area to about 50 pounds of treatment composition per 1,000 square feet of performance area. The exact application rate of treatment composition per square foot of performance area is determined by considering the soil composition, surface, climate and location. Soils which contain large amounts of sands generally require more treatment composition per square foot of performance area, while hard-packed dirt areas with relatively large clay contents require less treatment composition per square foot of performance area. In general, the preferred range using the particular treatment composition commercially available from Allied Colloids, sold under the brand name of Alcosorb AB3C, has been found to be about 7.5 pounds of treatment composition per 1,000 square feet of performance area to about 30 pounds of treatment composition per 1,000 square feet of performance area. The lower limit appears to be the most significant in that at least enough treatment composition must be applied to the performance area to effect the desired result of substantially reducing dust in the performance arena, and it should be in sufficient quantities to absorb excess water such as rainwater. Higher rates might effect the dust reducing capability of the treatment, and will act to extend the effect of the treatment composition without further work in the performance area. The higher rates also effect the cushioning effect achieved by the treatment composition in that more treatment composition results in a greater cushioning effect if desired and economically feasible.

After the treatment composition has been applied to the performance area in the performance arena, an effective amount of water is applied to the soil and the treatment composition. The amount of water should be sufficient to saturate the treatment composition so that the treatment composition substantially absorbs the maximum amount of water and expands to its maximum capability. Excess water is undesirable in that it intends to form puddles of water and creates mud problems Which is detrimental to performance activities occurring in the performance area. The treatment composition tends to absorb excess water, such as rainwater, thereby tending to maintain the performances substantially free of excess water.

After water has been applied to the soil and treatment composition, the soil and treatment composition then is worked in the manner described before until the treatment composition is dispersed about the performance area and into the soil with a substantial portion of the treatment composition being disposed at a level a predetermined distance below an upper surface of the soil. It is desirable that the treatment composition be dispersed to a level of about 4 inches below the upper surface of the soil and the treatment composition should be dispersed in the soil about equally throughout the entire performance area.

With respect to animal arenas typical application rates have been found to be 10 pounds of treatment composition per one thousand square feet of performance area for indoor arenas, and twelve–fifteen pounds of treatment and composition per one thousand square feet of performance area for outdoor arenas.

After applying the water to the soil and the treatment composition, the soil and the treatment composition then is worked again to obtain the predetermined consistency of the soil with the working being accomplished in the manner described before.

The present invention particularly is adapted to the performance area in an animal arena. The performance area in an animal arena is soil. During the performance activities in animal arenas, a great deal of dust is generated resulting in respiratory problems for the animals and participants and audience and it also effects allergy conditions of the participants and audience. In addition, dust coats tack such as the saddles, bridles and wearing apparel resulting in appearance and cleaning problems. In addition, it is important to maintain the consistency of the soil in the performance area, that is, the average size of the particles comprising the soil. It generally is undesirable to have large clods of dirt as part of the soil comprising the performance area.

Before the beginning of a particular show (performance activities) in an animal arena, it is common in the past to:

1. Work the performance area using a chisel or rototiller device or similar working implement to open the soil;
2. Water the performance area to moisten the soil to provide a softer surface for cushioning effect and to reduce dust;
3. Work again the performance area because the water tends to cause the soil to pack together and then breakup in clumps (reduce consistency);
4. Level the performance area by dragging chains with a tractor over the performance area to blend the wet and dry areas.
5. Hand water dry spots.

During a two day period of time while performance events are occurring, it is very likely that the foregoing working of the soil in the performance area and watering will have to be repeated a number of times, thereby resulting in substantial maintenance costs. In an outdoor animal arena, the working just described might be even greater due to weather conditions, either too dry resulting in increased dust or too wet resulting in mud and puddles. Also, in watering the performance area, one has to be careful not to use excessive water which tends to pack the soil or result in mud and/or puddles, therefor, the moisture will evaporate in reduced times requiring rewatering and breaking up at periodic intervals.

For example, considering a typical indoor animal arena with a performance area of about 15,000 square feet, the following represents a typical maintenance schedule and routine without applying the treatment composition in an accordance with the present invention:

WITHOUT CONDITIONER

1. PREPARE AND MAINTAIN ARENA FOR WEEKEND EVENT
    A. FRIDAY ROUTINE
        (1). ARENA FOOTING DRY, PACKED AND UNEVEN
            a. chisel and work surface with tractor—4 hr.
            b. water thoroughly—4 hr.
        (2) STANDING WATER CREATES MUD AND SLICK SPOTS, LOWER LAYER DRY
            a. work surface with tractor—2 hr.
            b. blend wet and dry areas with tractor—1 hr per wet spot (average 3 wet sites)
            c. hand water dry spots—1 hr (avg. 2 dry sites)
    B. SATURDAY ROUTINE
        (1). WARMUP PACKS SURFACE, CREATES DUST
            a. work surface with tractor before event—1 hr.
            b. water during break and work with tractor—1 hr.
        (2). WATER AND EVENTS CREATE MUD, SLICK AREAS, DANGEROUS AND UNPLEASANT WORKING ENVIRONMENT
            a. work surface with tractor to blend water added during performance—1 hr.
            b. water thoroughly for Sunday events—4 hr.
    C. SUNDAY ROUTINE
        (1). WARMUP PACKS SURFACE, CREATES DUST
            a. light watering after warmup—¼ hr.
            b. work surface with tractor before event—¼ hr.
        (2). DUST AND PACKING
            a. water during break—½ hr.
            b. work with tractor—½ hr.
        (3). MUD AND PACKING
            a. break between classes to water—¼ hr.
            b. work with tractor—¼ hr.
2. WEEKDAY ARENA MAINTENANCE
    A. NORMAL
        (1). water 2 or 3 times—8 hr total.
        (2). work surface with tractor—4 hr. total.
    B. ONE DAY EVENT (avg. 2 per month)
        (1). water thoroughly—2 hr.
        (2). work surface—2 hr.

Using the method of the present invention, the following represents a typical maintenance schedule and routine for the same 15,000 square foot animal arena described above:

WITH CONDITIONER

1. APPLY EASY RIDER ARENA CONDITIONER (once per 5 yr).
    A. prepare surface for conditioner.
        (1). chisel and work surface with tractor—4 hr.
        (2). water thoroughly—4 hr.
    B. Conditioner application.
        (1). spread conditioner—1 hr.
        (2). water thoroughly—4 hr.
        (3). work surface with tractor—1 hr.
2. PREPARE ARENA FOR WEEKEND EVENT
    A. FRIDAY
        (1). water arena thoroughly—2 hr.
        (2). drag surface with tractor—½ hr.
    B. SATURDAY
        (1). drag after halter classes—¼ hr.

(2). drag during break—¼ hr. (mixes drying surface with moisture under surface and levels arena).

C. SUNDAY (1). drag before show with tractor—½ hr.

(2). drag between classes—½ hr. (if necessary).

3. WEEKDAY ARENA MAINTENANCE

A. NORMAL (1). water once a month—4 hr.

(2). work arena once a month with tractor—1 hr.

B. ONE DAY EVENT (avg. 2 per month)

(1). water morning of event—1 hr.

(2). drag with tractor—1 hr.

The following represents the costs involved with the two examples given above with respect to the 15,000 square foot animal arena.

WITHOUT APPLYING TREATMENT COMPOSITION

1. WATERING TIME
    A. Per weekend event; 12 hr.×26 wk=312@$5.00; Cost=$1,560.00.
    B. Regular weekday; 9×26=234@$5,00; Cost=$1,170.00.
2. TRACTOR DRIVING TIME
    A. Per event; 12.5×26=325@$10,00; Cost=$3,250.00.
    B. Regular weekday; 5×26=130@$10.00; Cost=$1,300.00.
3. TRACTOR USE COST
    A. Event time; 12.5×26=325@$20.00; Cost=$6,500.00.
    B. Weekday time; 5×26=130@$20.00.; Cost=$2,600.00
4. Total cost for 6 month season=$16,380.00.

WITH APPLYING TREATMENT COMPOSITION IN ACCORDANCE WITH THE METHOD OF THE PRESENT INVENTION.

1. APPLICATION COST
    A. Treatment composition cost; 150 lb@$4.00 (10 lb/1000 sq. ft.); Cost=$600.00.
    B. Conditioner application; 1 hr@$5.00; Cost=$5.00.
    C. Watering time; 8 hr.@$5.00; Cost=$40.00.
    D. Tractor Cost
        (1). driving time; 5 hr.@$10.00, cost=$50.00.
        (2). use cost 5 hr.@$20.00; cost=$100.00.
    E. Total cost divided by 5 (life expectancy); 745÷5=$149.00
2. WATER TIME
    A. Per weekend event; 2 hr.×26=52@$5.00; cost=$260.00.
    B. Weekday
        (1). normal, 1 hr.×26=26@$5.00; cost =$130.00.
        (2). one day event; 0.5×26=13@$5.00; cost=$65.00.
3. TRACTOR USE COST
    A. Driving time; 0.75 hr.×26=19.5@$10.00; cost—$195.00.
    B. Use cost'0.75×26=19.5@$20.00; cost=$390.00.
4. TOTAL COST PER 6 MONTH SEASON=$1,189.00.

TOTAL COST COMPARISON

Without Conditioner: $16,380.00

With Conditioner: $1,189.00

Savings: $15,191.00

Considering the 15,000 square foot animal arena in the above examples, the method of present invention resulted in a cost reduction of 1842.50% per year, (32,760÷1778). The 1778 number is the maintenance cost for a year using the method of the present invention which is $1,189.00 maintenance cost for 6 months plus $589.00 maintenance cost for the second 6 months (the treatment composition does not have to be reapplied during the second 6 months).

Changes may be made in the methods described herein or in the steps or the sequence of steps of the method described herein without departing from the spirit and the scope of the invention as defined in the following claims.

What is claimed is:

1. A method for treating the soil in a performance area in a performance arena wherein performance activities occur comprising:

applying a treatment composition at an application rate of between five pounds of treatment composition per one thousand square feet of performance area and about fifty pounds of treatment composition per one thousand square feet of performance area to the soil in the performance area wherein the treatment composition is a water absorbing substance having a slow water releasing capability whereby the treatment composition absorbs water and slowly releases the absorbed water for substantially reducing dust resulting from performance activities; and working the treatment composition in the soil until the treatment composition is dispersed throughout the performance arena and into the soil with a substantial portion of the treatment composition being dispersed throughout the soil from a surface of the soil to a depth of at least about four inches below the surface of the soil.

2. The method of claim 1 wherein the treatment composition is further defined as a gel-forming, water absorbing polymer.

3. The method of claim 2 wherein the treatment composition is further defined as a polyacrylamide copolymer.

4. The method of claim 1 wherein, after the step of applying the treatment composition, the method further comprises:

applying an effective amount of water to the soil and treatment composition.

5. The method of claim 1 wherein the step of working the soil and the treatment composition is further defined as working the soil and the treatment composition until the treatment composition is dispersed in the soil about evenly over substantially the entire performance area.

6. The method of claim 1 wherein, after the step of working the treatment composition into the soil, the method further comprises:

applying an effective amount of water to the soil and treatment composition.

7. The method of claim 6 wherein, after the step of applying the effective amount of water, the method further comprises:

working the soil and treatment composition to obtain a predetermined consistency of the soil.

8. The method of claim 1 wherein the before the step of applying the treatment composition, the method further comprises:

working the soil in the performance area until the soil has a predetermined consistency, the treatment composition cooperating to maintain the predetermined consistency of the soil.

9. A method for treating the soil in a performance area in an animal area wherein performance activities occur comprising:

applying a treatment composition at an application rate of between five pounds of treatment composition per one thousand square feet of performance area and about fifty pounds of treatment composition per one thousand square feet of performance area to the soil in the performance area wherein the treatment composition is a water absorbing substance having a slow water releasing capability whereby the treatment composition absorbs water and slowly releases the absorbed water for substantially reducing dust resulting from performance activities; and working the treatment composition in the soil until the treatment composition is dispersed throughout the arena and into the soil with a substantial portion of the treatment composition being disposed throughout the soil from a surface of the soil to a depth of at least about four inches below the surface of the soil.

10. The method of claim 9 wherein, after the step of applying the treatment composition, the method further comprises:

applying an effective amount of water to the soil and treatment composition.

11. The method of claim 9 wherein the step of working the soil and the treatment composition is further defined as working the soil and the treatment composition until the treatment composition is dispersed in the soil about evenly over substantially the entire performance area.

12. The method of claim 9 wherein, after the step of working the treatment composition into the soil, the method further comprises:

applying an effective amount of water to the soil and treatment composition.

13. The method of claim 12 wherein, after the step of applying the effective amount of water, the method further comprises:

working the soil and treatment composition to obtain a predetermined consistency of the soil.

14. The method of claim 9 wherein before the step of applying the treatment composition, the method further comprises:

working the soil in the performance area until the soil has a predetermined consistency, the treatment composition cooperating to maintain the predetermined consistency of the soil.

15. The method of claim 9 wherein the animal arena is defined further as being an indoor animal area.

16. A method for treating the soil in a performance area in a performance arena wherein performance activities occur comprising:

applying a treatment composition at an application rate of between five pounds of treatment composition per one thousand square feet of performance area and about fifty pounds of treatment composition per one thousand square feet of performance area to the soil in the performance area wherein the treatment composition is a water absorbing substance having a slow water releasing capability whereby the treatment composition absorbs water and slowly releases the absorbed water for substantially reducing dust resulting from performance activities; and working the treatment composition in the soil until the treatment composition is dispersed throughout the performance arena and into the soil with a substantial portion of the treatment composition being dispersed throughout the soil from a surface of the soil to a predetermined distance below the surface of the soil.

17. The method of claim 16 wherein the treatment composition is further defined as a gel-forming, water absorbing polymer.

18. The method of claim 17 wherein the treatment composition is further defined as a polyacrylamide copolymer.

19. The method of claim 16 wherein, after the step of applying the treatment composition, the method further comprises:

applying an effective amount of water to the soil and treatment composition.

20. The method of claim 16 wherein the step of working the soil and the treatment composition is further defined as working the soil and the treatment composition until the treatment composition is dispersed in the soil about evenly over substantially the entire performance area.

21. The method of claim 16 wherein, after the step of working the treatment composition into the soil, the method further comprises:

applying an effective amount of water to the soil and treatment composition.

22. The method of claim 21 wherein, after the step of applying the effective amount of water, the method further comprises:

working the soil and treatment composition to obtain a predetermined consistency of the soil.

23. The method of claim 16 wherein the before the step of applying the treatment composition, the method further comprises:

working the soil in the performance area until the soil has a predetermined consistency, the treatment composition cooperating to maintain the predetermined consistency of the soil.

24. A method for treating the soil in a performance area in a performance arena wherein performance activities occur comprising:

applying a treatment composition at an application rate of between seven and one half pounds of treatment composition per one thousand square feet of performance area and about thirty pounds of treatment composition per one thousand square feet of performance area to the soil in the performance area wherein the treatment composition is a water absorbing substance having a slow water releasing capability whereby the treatment composition absorbs water and slowly releases the absorbed water for substantially reducing dust resulting from performance activities; and working the treatment composition in the soil until the treatment composition is dispersed throughout the performance arena and into the soil with a substantial portion of the treatment composition being dispersed throughout the soil from a surface of the soil to a predetermined distance below the surface of the soil.

25. A method for treating the soil in a performance area in an animal arena wherein performance activities occur comprising:

applying a treatment composition at an application rate of between five pounds of treatment composition per one thousand square feet of performance area and about fifty pounds of treatment composition per one thousand square feet of performance area to the soil in the performance area wherein the treatment composition is a water absorbing substance having a slow water releasing capability whereby the treatment composition absorbs water and slowly releases the absorbed water for substantially reducing dust resulting from performance activities; and working the treatment composition in the soil until the treatment composition is dispersed throughout the performance arena and into the soil with a substantial portion of the treatment composition being dispersed throughout the soil from a surface of the soil to a predetermined distance below the surface of the soil.

26. The method of claim 25 wherein the treatment composition is further defined as a gel-forming, water absorbing polymer.

27. The method of claim 26 wherein the treatment composition is further defined as a polyacrylamide copolymer.

28. The method of claim 25 wherein, after the step of applying the treatment composition, the method further comprises:

applying an effective amount of water to the soil and treatment composition.

29. The method of claim 25 wherein the step of working the soil and the treatment composition is further defined as working the soil and the treatment composition until the treatment composition is dispersed in the soil about evenly over substantially the entire performance area.

30. The method of claim 25 wherein, after the step of working the treatment composition into the soil, the method further comprises:

applying an effective amount of water to the soil and treatment composition.

31. The method of claim 30 wherein, after the step of applying the effective amount of water, the method further comprises:

working the soil and treatment composition to obtain a predetermined consistency of the soil.

32. The method of claim 25 wherein before the step of applying the treatment composition, the method further comprises:

working the soil in the performance area until the soil has a predetermined consistency, the treatment composition cooperating to maintain the predetermined consistency of the soil.

33. The method of claim 25 wherein the animal arena is defined further as being an indoor animal arena.

34. A method for treating the soil in a performance area in an animal arena wherein performance activities occur comprising:

applying a treatment composition at an application rate of between seven and one half pounds of treatment composition per one thousand square feet of performance area and about thirty pounds of treatment composition per one thousand square feet of performance area to the soil in the performance area wherein the treatment composition is a water absorbing substance having a slow water releasing capability whereby the treatment composition absorbs water and slowly releases the absorbed water for substantially reducing dust resulting from performance activities; and working the treatment composition in the soil until the treatment composition is dispersed throughout the performance arena and into the soil with a substantial portion of the treatment composition being dispersed throughout the soil from a surface of the soil to a predetermined distance below the surface of the soil.

* * * * *